United States Patent [19]
Dreshman

[11] 3,866,484
[45] Feb. 18, 1975

[54] RACK AND PINION ACTUATED MACHINE

[75] Inventor: Roy H. Dreshman, Munhall, Pa.

[73] Assignee: R. H. Dreshman & Sons, Inc., Homestead, Pa.

[22] Filed: June 22, 1973

[21] Appl. No.: 372,766

Related U.S. Application Data

[60] Continuation of Ser. No. 69,421, Sept. 3, 1970, abandoned, which is a division of Ser. No. 749,356, Aug. 1, 1968, Pat. No. 3,608,878.

[52] U.S. Cl. ............... 74/422, 104/147 R, 104/244, 105/29 R, 105/30, 105/163 SK, 266/23 K
[51] Int. Cl. ....... B23k 7/10, B61c 11/04, F16h 1/04
[58] Field of Search ........ 104/242, 243, 147 R, 244; 105/29 R, 30, 163 R, 163 SK, 179; 212/18; 214/15 R; 74/422; 266/23 K

[56] References Cited
UNITED STATES PATENTS

| | | | |
|---|---|---|---|
| | 7/1836 | Edgar | 105/29 R |
| 131,839 | 10/1872 | Baker | 105/30 X |
| 399,299 | 3/1889 | Van Zile | 105/30 |
| 594,832 | 11/1897 | Leland | 105/29 R |
| 661,663 | 11/1900 | Kottgen | 105/30 X |
| 792,997 | 6/1905 | Lindblad | 105/30 X |
| 891,882 | 6/1908 | Valentine | 105/30 |
| 1,503,999 | 8/1924 | Sheal | 105/29 R |
| 3,429,280 | 2/1969 | Deshew et al. | 105/29 R |
| 3,467,263 | 9/1969 | Auzins et al. | 214/15 R |
| 3,608,878 | 9/1971 | Dreshman | 212/18 X |
| 3,707,125 | 12/1972 | Milenkovic et al. | 104/244 X |

*Primary Examiner*—M. Henson Wood, Jr.
*Assistant Examiner*—Howard Beltran
*Attorney, Agent, or Firm*—Donnelly, Maky, Renner & Otto

[57] ABSTRACT

Flame cutting machine for cutting iron or steel plates, bars, structural shapes, castings, etc., characterized in the provision of a variable speed positive drive means for the rail mounted torch carriage or gantry thereof by which the carriage is driven in smooth, uniform manner at any cutting speed between zero and maximum, said drive means being mounted on the carriage for floating movement to accommodate misalignment of the carriage guide rails. Machine further characterized in the provision of floating positive drive means for rapid traverse of the carriage.

4 Claims, 8 Drawing Figures

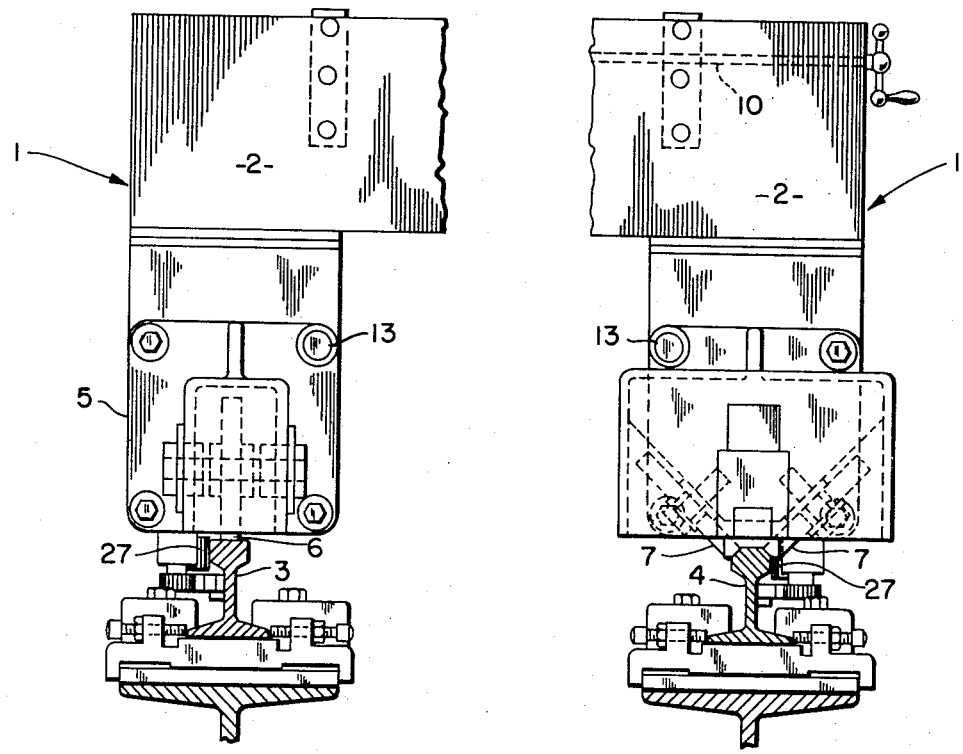
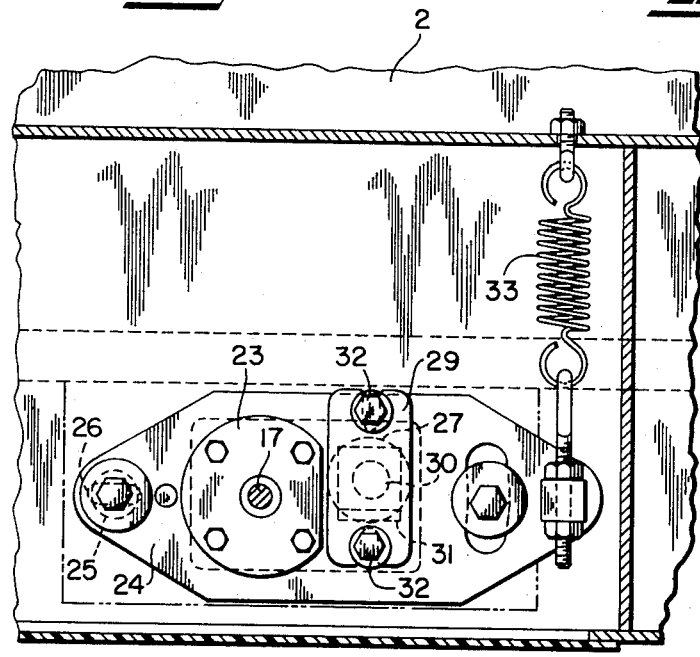

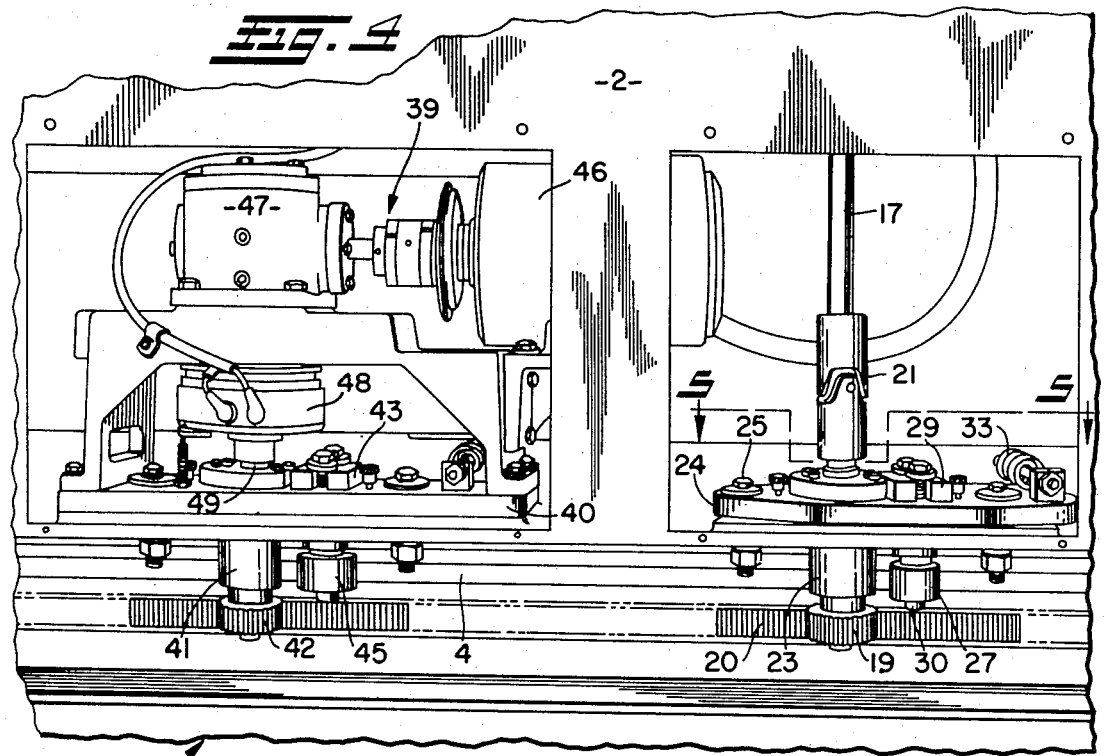
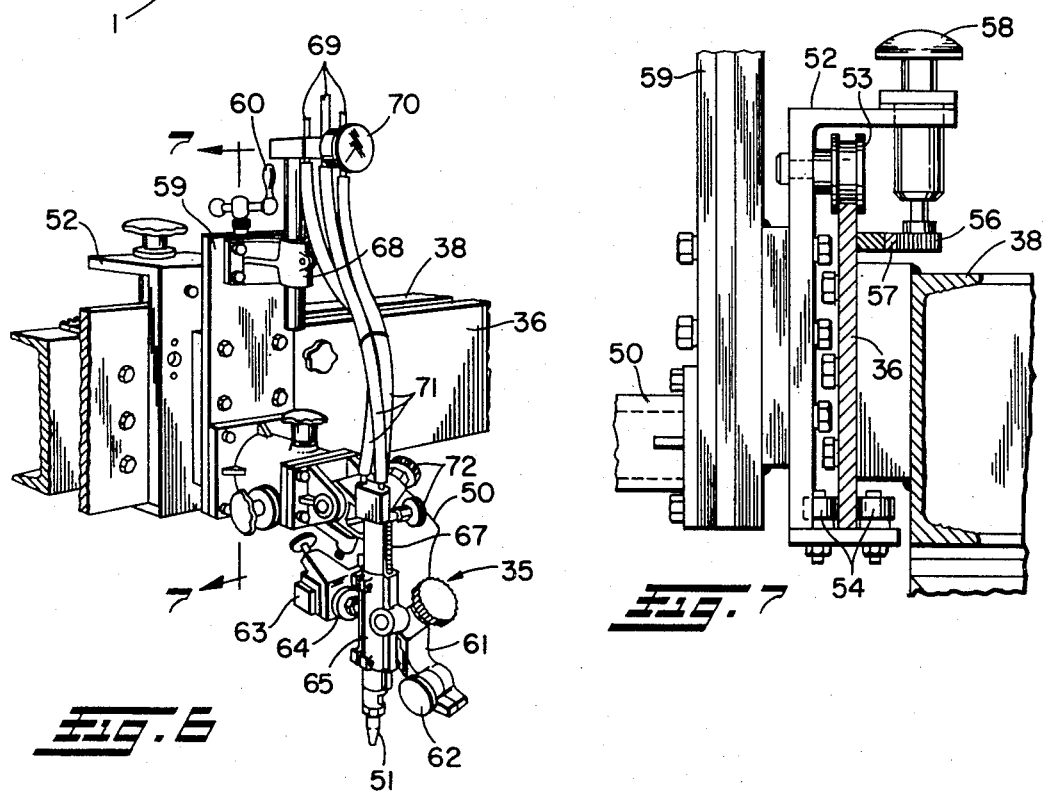

RACK AND PINION ACTUATED MACHINE

This application is a continuation of my copending application Ser. No. 69,421 filed Sept. 3, 1970, now abandoned, which was a division of Ser. No. 749,356 filed Aug. 1, 1968, now U.S. Pat. No. 3,608,878, issued Sept. 28, 1971.

BACKGROUND OF THE INVENTION

Heretofore, flame cutting machines have comprised torch carriages driven along parallel rails by friction drive wheels; these machines operating in satisfactory manner in a lineal speed range of say 0 to 80 in./min. However, for a greater speed range of say 0 to 250 in./min. a friction wheel drive machine requires excessive rail length for acceleration and deceleration of the carriage to and from such higher cutting speeds to prevent drive wheel slippage and skidding. Also, rapid carriage traverse at say, 50 ft./min. is not feasible in a friction drive machine again because of added rail length required for acceleration and deceleration.

SUMMARY OF THE INVENTION

In the present invention, the torch carriage is positively driven, as by a gear-rack drive, on parallel rails, thus enabling constant, smooth carriage movement at high speed for a major portion of the length of the rails; such drive means being floatable on the torch carriage so as to maintain the pitch centers between the gears and the racks even though the rails may not be perfectly parallel to each other.

It is another object of this invention to provide an independent floating rapid traverse drive mechanism for the torch carriage whereby the carriage may be quickly and accurately positioned prior to commencing its stock cutting operation.

It is another object of this invention to provide a carriage having a transverse beam having a track on which one or more single or multiple cutting torches may be adjustably mounted for movement longitudinally with the carriage for making one or more longitudinal cuts in the stock.

It is another object of this invention to provide a carriage having a transverse beam having a track on which a single or multiple cutting torch may be mounted for movement longitudinally therealong for making one or more transverse cuts in the stock.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

BRIEF DESCRIPTION OF THE DRAWING

FIG. 2 is a cross-section view taken substantially along the line 2—2, FIG. 1;

FIG. 3 is a cross-section view taken substantially along the line 3—3, FIG. 1;

FIG. 4 is a perspective view of a portion of one end of the machine carriage as viewed along the line 4—4, FIG. 1;

FIG. 5 is a top plan view of the floating gear drive mechanism as viewed along the line 5—5, FIG. 4;

FIG. 6 is a fragmentary perspective view showing a typical flame cutting torch mounted on the transverse track of the carriage;

FIG. 7 is a transverse cross-section view taken substantially along the line 7—7, FIG. 6.

DESCRIPTION OF THE PREFERRED EMBODIMENT

Figure 1:
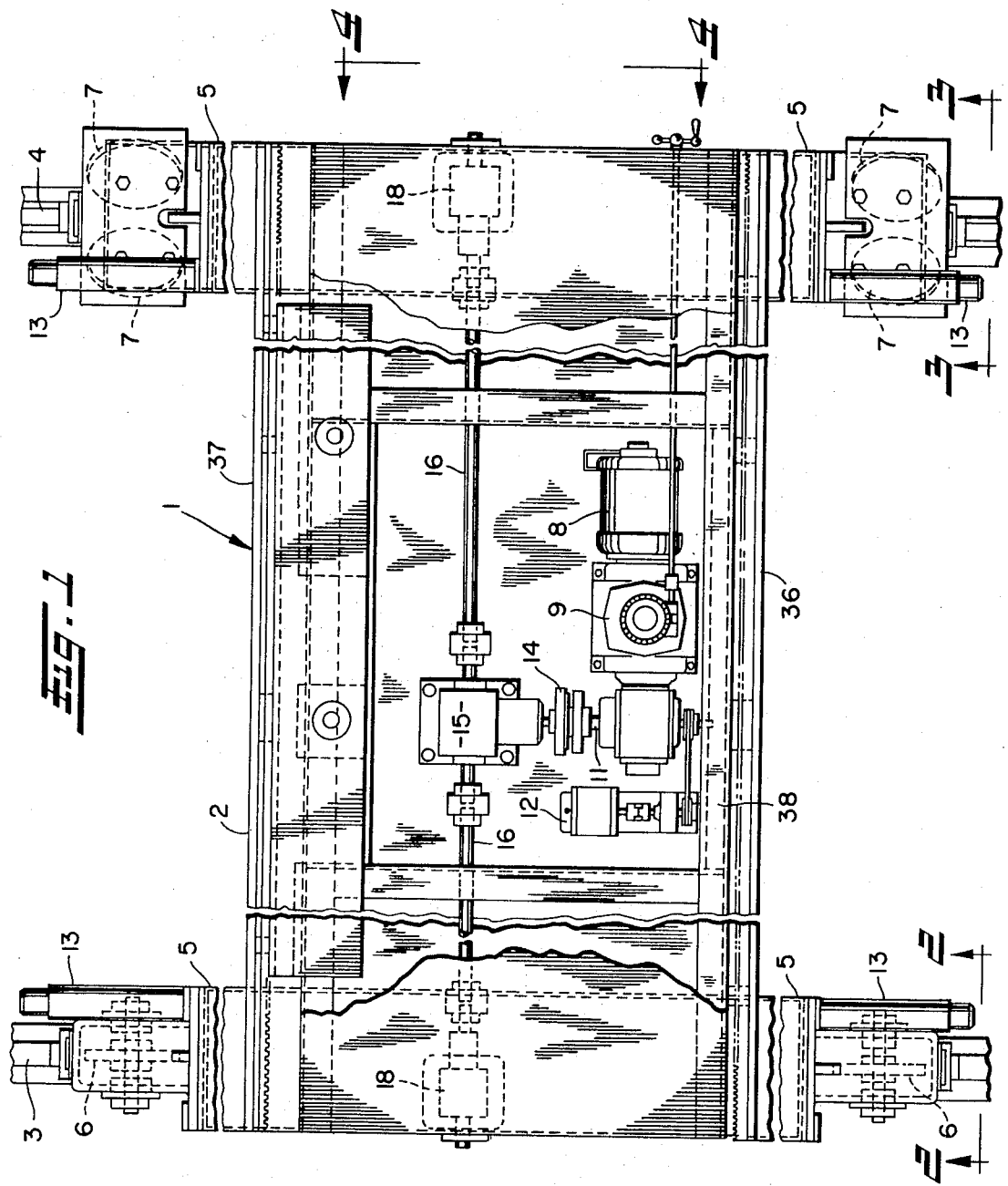
FIG. 1 is a top plan view of one embodiment of the present invention.

Referring now in detail to the drawings, and first more especially to FIGS. 1 to 3, the flame cutting machine 1 comprises a carriage 2 which extends transversely across the parallel rails 3 and 4 and has longitudinal extensions 5 at its ends in which are mounted guide rolls 6 and 7 which engage the respective rails 3 and 4. The extensions 5 are further provided with yieldable bumpers 13 adapted to engage stops, not shown, at the ends of the respective rails 3 and 4.

The guide rolls 7 are tilted to engage the V-rail 4 thus to maintain the carriage against skewing, whereas, the other guide rolls 6 are cylindrical and ride on the flat top surface of the other rail 3, whereby the carriage 2 is guided for straight line movement along rail 4 even though rail 3 is not perfectly parallel to rail 4.

The Carriage Drive Means

As shown in FIGS. 1 to 5, the carriage 2 is driven longitudinally along the rails 3 and 4 by an electric drive motor 8 and a variable speed drive 9 which is adjusted from say 0 to 250 in./min. carriage speed by turning the speed adjusting shaft 10. The output shaft 11 is coupled to a tachometer generator 12 or the like, which will operate a suitable indicator gauge, not shown, to enable precision adjustment of carriage speed. The drive shaft 11 has suitable clutch means 14 and enters a gear box 15 from which horizontal drive shafts 16 extend in opposite directions, the shafts 16 being coupled to vertical drive shafts 17 by angle drive units 18, said shafts 17 having gears 19 keyed thereto for meshing with gear racks 20 on the sides of the respective rails 3 and 4. Each vertical drive shaft 17 has two universal joints 21, one of which is shown in FIG. 4, whereby each gear 19 may float transversely and be adjusted longitudinally of its respective rail 3 or 4.

Adjustable and Floating Drive Mechanism

As best shown in FIGS. 4 and 5 the drive shaft 17 to which the drive gear 19 is affixed is journalled in a bearing housing 23, the bearing housing being secured to a plate 24 which at one end is mounted for swinging floating action on a pivot 25. The pivot 25 is longitudinally adjustably mounted in a slot 26 in the carriage 2 so that the teeth of the drive gear 19 will mesh with the teeth of the gear rack 20 affixed on the outside of the respective side of each rail 3 and 4. The universal joints 21 aforesaid make possible such longitudinal adjustment of the bearing housing 23 and plate 24.

Each plate 24 has a guide roller 27 engaged on the outside of the respective rail 3 or 4 which is in parallel relation to the respective gear rack 20. The support 29 for said guide roller shaft 30 is transversely adjustable in a slot 31 in the said plate and is secured as by the bolts 32 in adjusted position whereat, when the guide roller 27 is engaged with its respective rail 3 or 4, the pitch circle of the drive gear 19 is tangent to the pitch line of the gear rack 20.

Each plate 24 has an arcuate slot struck from the center of the pivot 25 so that the plate 24, together with the guide roller 27 and drive gear 19, may swing out or in to maintain proper gear and rack tooth engagement despite departure of rails 3 and 4 from true parallelism, an adjustable tension spring 33 connected to the carriage 2 and to the end of the plate 24 opposite the pivot 25 holding the guide roller 27 in engagement with the respective rail 3 or 4.

From the foregoing, it can be seen that when the drive motor 8 is energized and the clutch 14 is engaged, the drive gears 19 in rotating in opposite directions will move the carriage 2 along the rails 3 and 4 whereby one or more cutting torches 35 mounted on the track 36 or 37 on the carriage beam 38 will cut the iron or steel plate, bar, structural shape, or the like supported between the rails 3 and 4 beneath the carriage beam 38.

Rapid Traverse Mechanism

The rapid traverse mechanism 39 as shown at the left side of FIG. 4 is adjustably and floatably mounted in much the same manner as the carriage drive mechanism just described, except that the adjustable and pivotally mounted plate 40 which carries the support 41 for the rapid traverse drive gear 42 and the support 43 for the guide roller 45 has secured thereto the drive motor 46 and worm drive unit 47 with intervening clutch means 48 between the worm drive unit 47 and the output shaft 49 to which the gear 42 is affixed. The rapid traverse mechanism 39 may, as aforesaid, be arranged to rapidly move the carriage 2 at a speed of for example, 50 ft./min., while the cutting drive mechanism may be accurately adjusted between 0 to 250 in./min.

Cutting Torch Unit

Referring to FIGS. 6 and 7, the cross beam 38 has tracks 36 and 37 on the front and rear sides thereof, and adjustable longitudinally along either track 36 or 37 are one or more torch units 50. As shown in FIGS. 6 and 7, the torch unit 50 there shown has a single torch 51 thereon but it is to be understood that two, three, or more torches 51 may be mounted on each torch unit 50 as hereinafter described.

Each torch unit 50 comprises a base 52 which is guided for longitudinal movement with respect to the track 36 or track 37, as by means of upper and lower rollers 53 and 54 (see FIG. 7), and the base 52 is adjustable longitudinally along the track 36 or 37 as by the gear 56 which meshes with a rack 57 on the rear side of the track. If desired, the gear 56 may be driven by a reversible electric motor instead of the hand wheel 58 shown.

Mounted on said base 52 is a vertical slide 59 which may be vertically adjusted by turning the crank 60, and, again, said vertical adjustment operation may be motorized by substituting a reversible electric motor for the crank 60. Pivotally mounted at the lower end of the vertical slide 59 is a riding device 61 equipped with a roller 62 which runs along the top surface of the stock to be cut. Extending laterally from the riding device 61 is an elongated bar 63 which has a torch clamp 64 adjustable therealong and as evident, the bar may be of any length for mounting two, three or more torches 51 thereon.

The oxyacetylene blow pipe or torch 51 or the like is mounted in a sleeve portion 65 of the clamp 64 and is vertically adjustable therein as by the conventional worm and gear adjusting mechanism which cooperates with the gear rack 67 formed on the torch 51. In this way, when two or more torches 51 are mounted on a single riding device 61 each may be adjusted up or down to be a specified distance from the stock which is to be cut. The upper portion of the vertical slide 59 is provided with a clamp 68 in which the oxygen and acetylene supply hoses 69 are connected, including suitable oxygen pressure gauge 70. From this supply manifold separate hoses 71 are connected to the torch 51, the latter having suitable control valves 72.

Figure 8:
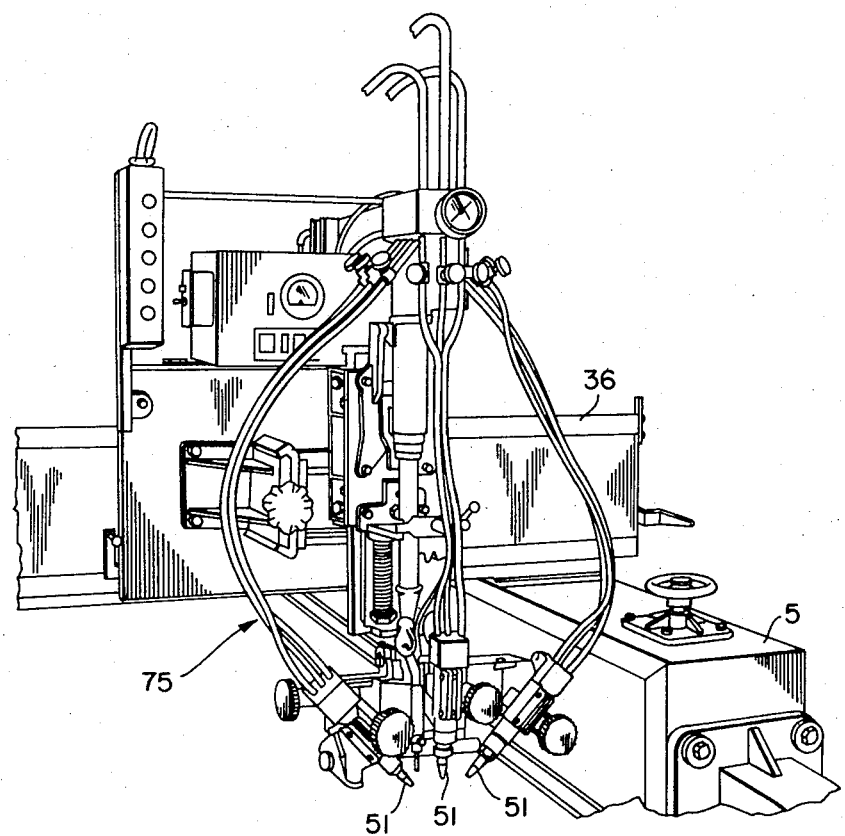
FIG. 8 is a perspective view of a motorized torch mounted for movement longitudinally of the carriage beam.

Referring now to FIG. 8, the torch unit 75 is shown as being motorized for moving longitudinally along the adjustable track 36 or 37. In this case three torches 51 are shown in converging relation, the vertical torch 51 being effective to cut through the stock as carriage 2 travels longitudinally and the inclined torches 51 being effective to bevel the edges of the cut stock.

Other modes of applying the principle of the invention may be employed, change being made as regards the details described, provided the features stated in any of the following claims, or the equivalent of such, be employed.

I therefore particularly point out and distinctly claim as my invention:

1. A machine for movably carrying a flame-cutting torch and the like comprising a carriage; a pair of essentially parallel rails supporting said carriage on wheels for horizontal movement longitudinally therealong, said wheels forming a lateral interlock on at least one rail to maintain the carriage on the rails, each rail having on one side thereof a longitudinally extending gear rack with generally vertically extending teeth having their pitch lines disposed in a vertical plane; drive gears having vertical axes and transversely horizontally movable support means therefor on said carriage to maintain said gears in meshing engagement with the respective racks despite deviation of said rails from true parallelism in a horizontal plane.

2. The machine of claim 1 wherein each support means comprises a drive gear bearing member; a pivot on said carriage on which said bearing member is pivotally mounted about an axis parallel to the axis of the drive gear journalled in said bearing member; spring means acting on said bearing member to swing it and said drive gear about said pivot toward the associated rack; and a guide roll horizontally adjustably journalled on said support means for rotation about a vertical axis radially spaced from said pivot; said guide roll being engaged with a horizontally extending surface of the associated rail to maintain the pitch circle of said drive gear tangent to the pitch line of the teeth of the associated rack during travel of said carriage along said rails.

3. A machine for movably carrying a flame-cutting torch and the like comprising a carriage; a pair of essentially parallel rails supporting said carriage on wheels for movement longitudinally therealong, each rail having on one side thereof a longitudinally extending gear rack; said wheels forming a lateral interlock on at least one rail to maintain the carriage on the rails;

drive means on said carriage having oppositely extending horizontal drive shafts which terminate in downturned shaft portions; drive gears on said shaft portions meshing with said gear racks on the respective rails to propel said carriage along said rails; one of said shaft portions having a universal joint connection with its drive shaft; a support means supporting said one downturned shaft portion below said universal joint connection; said support means being movably connected to the carriage for horizontal lateral movement of the support means and said one shaft portion relative the carriage; and the support means thereby maintaining the drive gears in meshing engagement with the respective racks despite deviation of the rails and racks from true parallelism in a horizontal plane.

4. The machine of claim 3 wherein one of said rails guides said carriage for movement in a straight path parallel to said one rail; and wherein the other of said rails is arranged to support that side of said carriage without disturbing the straight path of movement of said carriage despite slight departure of said other rail from straightness and/or non-parallelism with respect to said one rail, the support means movably connected to the carriage supporting the downturned shaft portion on which the gear engaging the rack associated with said other rail is supported.

* * * * *